United States Patent
Bryan et al.

[11] Patent Number: 5,171,520
[45] Date of Patent: Dec. 15, 1992

[54] WEAR RESISTANT COATING FOR FUEL CLADDING

[75] Inventors: William J. Bryan, Granby, Conn.; David Jones, Austin, Tex.

[73] Assignee: Combustion Engineering, Inc., Windsor, Conn.

[21] Appl. No.: 577,688

[22] Filed: Sep. 4, 1990

[51] Int. Cl.$^5$ .............................. G21C 3/00
[52] U.S. Cl. .................... 376/414; 376/416; 376/425
[58] Field of Search ............ 376/416, 414, 425; 501/11, 61, 62, 21, 55

[56] References Cited

U.S. PATENT DOCUMENTS

| | | | |
|---|---|---|---|
| 3,784,384 | 1/1974 | Webb | 501/21 |
| 4,097,402 | 6/1978 | Grubb | 252/301.1 R |
| 4,432,933 | 2/1984 | Teitel et al. | 376/152 |
| 4,551,647 | 11/1985 | Day | 310/335 |
| 4,573,629 | 3/1986 | Imahashi et al. | 228/173.2 |
| 4,990,303 | 2/1991 | Bryan et al. | 376/419 |

Primary Examiner—Donald P. Walsh
Assistant Examiner—Meena Chelliah
Attorney, Agent, or Firm—Chilton, Alix & Van Kirk

[57] ABSTRACT

A wear resistant coating (50) for fuel rod cladding (20) comprises a ceramic material (52) which is premixed with a glass (54). The cladding tube is heated and the ceramic/glass mixture is flame sprayed onto the cladding tube. The coating is applied to lower portions of the fuel rods (10) in the area of the first support grid (12) where debris tends to fret the fuel rod.

28 Claims, 1 Drawing Sheet

WEAR RESISTANT COATING FOR FUEL CLADDING

BACKGROUND OF THE INVENTION

This invention relates generally to nuclear fuel elements. More particularly, this invention relates to fuel elements which employ a cladding tube containing a fuel pellet of fissionable material for use in a nuclear reactor.

One form of a fuel rod typically employed in nuclear reactors comprises a fuel pellet which is contained in a cladding tube. The cladding tube is typically manufactured from zirconium-alloy or various metal-alloy materials. The fuel rods, in conventional reactor configurations, are mounted to a support grid. The lower portions of the rods below the grid are disposed in regions where debris may be entrapped.

The zirconium-alloy fuel cladding has a useful life which is subject to debris fretting. The zirconium-alloy fuel rods employed in nuclear reactors are exposed to high temperature water which is typically in the range 300° C. to 400° C. The water is subjected to high pressures and frequently contains metal particles of stainless steel or Inconel-alloy steel which originate at reactor locations remote from the fuel rods themselves. The metallic particles tend to collect near the bottom of the fuel rods and are entrapped by the first support grid for the fuel rods. The metallic debris may be maintained in a quasi-suspensive state due to vibration and movement of the water through the reactor.

The metallic particles which form the debris may be hardened by radiation. The hardened metallic state tends to rapidly accelerate the wear or erosion of the cladding tubes of the fuel rods. The resultant tube fretting may be sufficient so as to ultimately result in penetration of the cladding tube wall, thereby resulting in failure of the cladding. Thus, the long term integrity of the fuel cladding is a direct function of resistance to debris fretting.

The hostile environment of the reactor dictates that any structural modification or enhancement to the cladding tube satisfy a number of constraints. First, any wear resistant structure must be significantly harder than the metallic debris particles to effectively resist abrasion from the particles. Any coating applied to the cladding tube must have excellent long term adhesive qualities, be fully compatible with the thermal expansion of the cladding tube and also form a strong bond with the tube. In addition, any coating must be resistant to the chemical environment in the reactor which characteristically includes hot water at a pH of approximately 7. The thickness of any coating applied to the cladding tubes must be relatively thin so that the flow of water around the fuel rods is not significantly impeded by the coating and that the coating not function as a thermal barrier. Any coating is preferably capable of application in a process which does not require heating of the cladding tube above 400° C. In addition, it is also desirable that the coating be inexpensive and be suitable for mass production.

Coatings of various forms and functions have been applied to the inside surfaces of cladding tubes for nuclear reactors. For example, U.S. Pat. Ser. No. 07/211,182 assigned to the assignee of the present invention discloses a fuel element for a nuclear reactor having a zirconium-tin alloy cladding tube. A thin coating of an enriched boron-10 glass containing burnable poison particles is deposited on the inside of the cladding tube from a liquid sol-gel. The coating includes a glass binder which is applied on the inside of the zirconium-alloy cladding tube.

U.S. Pat. No. 3,625,821 discloses electroplating the inside surface of a tube with coating of a matrix metal and boron compound of, for example, nickel, iron manganese or chrome. Boron compounds such as boron nitride, titanium boride and zirconium boride are electroplated onto a Zircaloy substrate. U.S. Pat. No. 4,695,476 discloses a vapor deposition of volatized boron compounds on the inside of fuel rod cladding.

SUMMARY OF THE INVENTION

Briefly stated, the invention in a preferred form is a wear resistant coating which is applied to a cladding tube for a fuel element employed in a nuclear reactor. The coating is applied to the outside surface of the cladding tube and comprises a matrix of ceramic material and glass. The glass acts as a binder to bond the ceramic material to the cladding tube. The coefficient of thermal expansion of the ceramic material and the glass is approximately equal to the coefficient of thermal expansion of the cladding tube material. The cladding tube may be substantially formed from a zirconium-alloy. Zircon may be employed as the ceramic material. The glass may be calcium zinc borate, calcium magnesium aluminosilicate or sodium borosilicate. The coating in one embodiment has an outside surface which substantially consists of the ceramic material and the coating has a thickness of approximately 5 mil.

The ceramic material and glass is premixed to form a coating mixture. The ceramic material and glass is mixed in ratios sufficient to ensure bonding the ceramic material to the cladding tube. The cladding tube is preheated to a temperature between 300° C. to 400° C. The coating mixture is then flame sprayed onto the outside surface of the tube to form the wear resistant matrix. The flame spraying is conducted under conditions wherein the glass particles are transformed to a semi-molten state while the ceramic particles remain in a non-molten state. The outside surface of the matrix is etched to remove glass material to form an exposed outside surface which substantially consists of the ceramic material. Normally, the coating mixture is only applied to the surface of the one end of each rod that will be retained in the vicinity of the lower support grid.

An object of the invention is to provide a new and improved fuel cladding having an enhanced resistance to wear from metallic debris surrounding the fuel rods of a nuclear reactor.

Another object of the invention is to provide a new and improved coating which may be applied in an efficient and cost effective manner to enhance the wear resistance of a fuel rod cladding.

A further object of the invention is to provide a new and improved method for manufacturing a cladding tube having enhanced wear resistant properties.

Other objects and advantages of the invention will become apparent from the drawings and the specification.

DESCRIPTION OF THE PREFERRED EMBODIMENTS

With reference to the drawings wherein like numerals represent like parts throughout the figures, a fuel rod having an enhanced wear resistant coating in accordance with the present invention is generally designated by the numeral 10. Fuel rod 10 is employed in a nuclear reactor and includes a zirconium-alloy cladding tube 20 which contain pellets 30 of fissionable material such as for example, $UO_2$. The tube is commonly made of zirconium-tin alloy such as Zircolay-2 or Zircolay-4.

Figure 1:
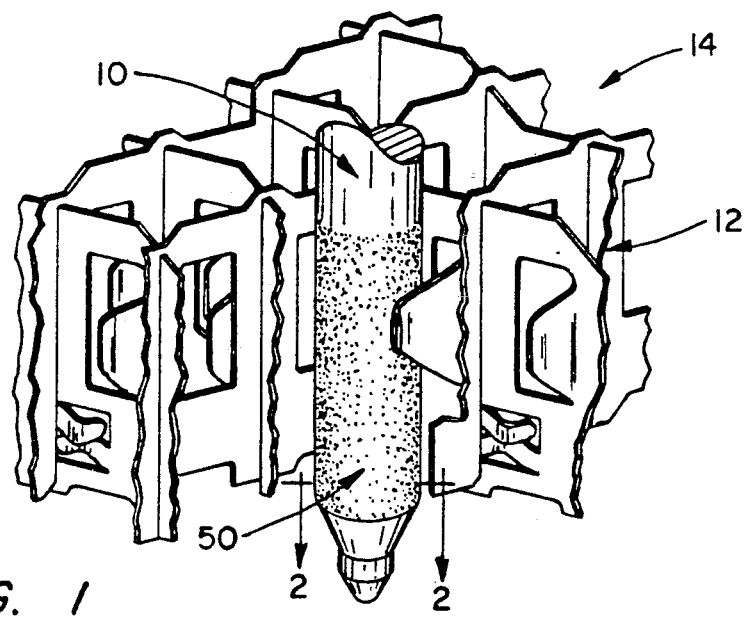
FIG. 1 is a perspective view, partly in schematic, illustrating a fuel assembly including fuel rods having a wear resistant coating in accordance with the present invention.

The fuel rods 10 are conventionally mounted in parallel fashion to a support structure including a support grid 12 of a fuel assembly 14 as schematically illustrated in FIG. 1. The lower portions of the fuel rods are in effect cantilevered into the flow of water which commonly contains debris comprising metallic particulate matter such as stainless steel or Inconel alloy steel (not illustrated). The debris particles are often hardened by irradiation and are known to rapidly fret the tubes 20 as the water flows in the direction indicated by the arrow.

Figure 2:
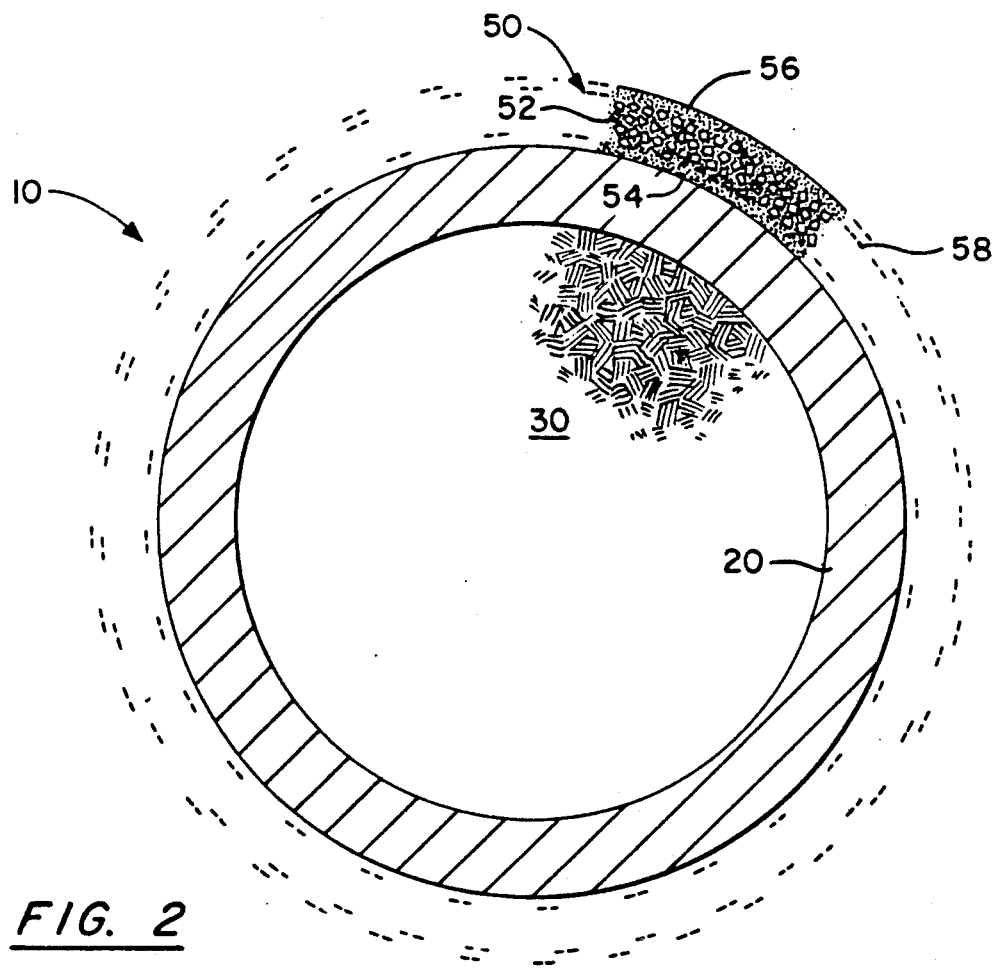
FIG. 2 is an enlarged cross-sectional view, partly in schematic, of a fuel rod taken along the line 2—2 of FIG. 1.

In accordance with the invention, a coating 50 is applied to the exterior surface of the cladding tube 20. The cladding tube coating 50 is comprised of a matrix of a ceramic material 52 and a glass binder 54, both of which are schematically illustrated. The relative dimensions of coating 50 is exaggerated in FIG. 2 for description purposes. The ceramic material preferably has a high degree of hardness, a high degree of thermal conductivity and a thermal expansion which is approximately equal to that of the zirconium-alloy substrate of the cladding tube 20. A preferred ceramic material is zircon which in a powder form has a particulate diameter on the order of approximately 10–60 microns.

The ceramic material 52 is mixed with a glass 54 which also has a thermal expansion compatible with the zirconium-alloy cladding tube. A number of glass compositions are suitable. The selected glass should have a long term resistance to very hot water which for the reactor environment typically is on the order 400° C. Calcium zinc borate, calcium magnesium aluminosilicate, and sodium borosilicate are all suitable glasses.

Thermal coefficients of expansion for the various materials are set forth in the following table:

| Material | CTE $\times 10^{-7}$ C° |
| --- | --- |
| Zircaloy-4 | 48.9 |
| Zircon | 53 |
| Calcium zinc borate | 45–60 |
| Calcium magnesium aluminosilicate | 40–70 |
| Sodium borosilicate | 30–100 |

The ceramic material 52 and the glass 54 are premixed in a ratio so that the there will be sufficient glass to bind the ceramic material and bond the ceramic material to the cladding tube substrate. The particles of the ceramic and glass material have diameters typically on the order of 10–60 microns. The glass particles are preferably significantly smaller than the ceramic particles so that the glass particles will heat rapidly and a large quantity of particles will be available for bonding to each ceramic particle.

The zirconium-alloy cladding tube is heated to a temperature which is approximately in the range 300° C. to 350° C. It is naturally desirable to keep the processing temperature of the cladding tube below 400° C. The mixture of the ceramic and glass particles is then flame sprayed onto the cladding tube. The flame spray characteristics are selected so that the glass particles will assume a semi-molten state while the ceramic particles are maintained in a non-molten state. The coating which is formed on the cladding tube substrate is primarily a ceramic composition with just enough glass to provide sufficient bonding of the ceramic material to the cladding tube.

It is not required that the glass have a high degree of hardness, although glasses typically will be harder than metals. The ceramic particles are bonded to the tube by the glass. The glass which bonds the ceramic particles is primarily disposed on the back side of the ceramic particles where the glass is not subject to abrasion. Even if glass on the outer surfaces is abraded by metallic particles, it will eventually wear away to expose the ceramic substrate and will function as a wear resistant barrier to prevent further wear of the coating.

The initial coating has some glass at the outer layer. The outer glass layer 56 may then be etched to remove the outer glass layer and expose the ceramic particles so that the outer surface 58 is substantially entirely composed of ceramic particles. While etching of the outer glass is not required, there may be some benefits to removing the glass since metallic particles of the debris could potentially strike the outer glass layer and initiate cracks and faults which would propagate throughout the glass matrix.

The coating 50 can be applied to the cladding tube in a flame spray process which is efficient and cost effective. The thickness of the coating is preferably a few mils. For example, preferably the thickness of the coating is 5 mils or less. A relatively thick coating would potentially impede the coolant water flow around the cladding tubes. In addition, thicker coatings might undesirably function as a thermal barrier.

EXAMPLE

In one form of the coating 50, 6 kilograms of zircon ceramic material 52 having a nominal particle size diameter of 30 microns was premixed with 4 kilograms of calcium zirc borate glass 54 having a nominal particle diameter of <10 microns. A zirconium-alloy tube having a nominal outside diameter of 0.4 inch was heated to a temperature of approximately 200° C. The coating mixture was flame sprayed onto the outside surface of the cladding tube at a rate of 5 seconds per linear inch of tube so as to form an outer coating of approximately 5 mils in thickness. After the initial coating was applied, an etching solution of dilute HF acid was applied to remove the outer glass material.

It should be appreciated that the coating 50—even though relatively thin in cross-section—provides an effective abrasion resistant coating for the cladding tube 20. The coating 50 is substantially harder than the metal particles present in the surrounding reactor debris. The coating 50 is resistant to the chemical environment in the reactor and does not impede the flow of coolant water around the tubes. The coating also does not constitute a significant thermal barrier. Moreover, the coating can be applied by a flame spray in a relatively inexpensive and cost effective manner which is suitable for mass production of the cladding tubes.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A wear resistant fuel element for use in a nuclear reactor comprising:
   cladding means defining a cladding tube having an inside surface for containing a fissionable material and an outside surface; and
   coating means carried by said outside surface comprising a matrix of ceramic material and glass, said ceramic material having a coefficient of thermal expansion approximately equal to the coefficient of thermal expansion of said cladding tube and being bonded to said tube by said glass.

2. The fuel element of claim 1 wherein the glass has a coefficient of thermal expansion approximately equal to the coefficient of thermal expansion of the cladding tube material.

3. The fuel element of claim 1 wherein the cladding tube is substantially formed from a zirconium-alloy.

4. The fuel element of claim 3 wherein the ceramic material comprises zircon.

5. The fuel element of claim 1 wherein the glass comprises a material selected from the group consisting of calcium zinc borate, calcium magnesium aluminosilicate, and sodium borosilicate.

6. The fuel element of claim 1 wherein the coating has an outside surface substantially consisting of said ceramic material.

7. The fuel element of claim 1 wherein the coating has a thickness of approximately 5 mil.

8. The fuel element of claim 1 further comprising lower grid means for supporting said fuel element in an upright orientation wherein a lower end of the tube is disposed below the lower grid means and said coating is carried by said tube lower end.

9. The fuel element of claim 8 wherein the coating is carried by only a portion of said tube including the tube lower end.

10. A wear resistant cladding tube for use in a nuclear reactor comprising:
    an inside surface for containing a fissionable material, and
    an outside surface having a coating comprising a matrix of ceramic material and glass, the ceramic material having a coefficient of thermal expansion approximately equal to the coefficient of thermal expansion of the cladding tube and being bonded to the outside surface by the glass.

11. The cladding tube of claim 10, wherein the glass has a coefficient of thermal expansion approximately equal to the coefficient of thermal expansion of the cladding tube material.

12. The cladding tube of claim 10, wherein the cladding tube is substantially formed from a zirconium-alloy.

13. The cladding tube of claim 12, wherein the ceramic material comprises zircon.

14. The cladding tube of claim 10, wherein the glass comprises a material selected from the group consisting of calcium zinc borate, calcium magnesium aluminosilicate, and sodium borosilicate.

15. The cladding tube of claim 10, wherein the coating has an outside surface substantially consisting of the ceramic material.

16. The cladding tube of claim 10, wherein the coating has a thickness of approximately 5 mil.

17. The cladding tube of claim 10, wherein the tube has an upper end and a lower end, and the coating is present only on the outside surface of a portion of the lower end.

18. The cladding tube of claim 10, wherein the glass and ceramic have a coefficient of thermal expansion approximately equal to the coefficient of thermal expansion of the cladding tube, the cladding tube is substantially formed from a zirconium alloy, the ceramic material comprises zircon, and the glass comprises a material selected from the group consisting of calcium zinc borate, calcium magnesium aluminosilicate, and sodium borosilicate.

19. A wear resistant fuel element for use in a nuclear reactor comprising:
    cladding means defining a cladding tube having an inside surface for containing a fissionable material and an outside surface; and
    coating means carried by said outside surface comprising a matrix of ceramic material and glass, said glass having a coefficient of thermal expansion approximately equal to the coefficient of thermal expansion of said cladding tube, said ceramic material being bonded to said tube by said glass.

20. The fuel element of claim 19, wherein the cladding tube is substantially formed from a zirconium-alloy, the ceramic material comprises zircon, and the glass comprises a material selected from the group consisting of calcium zinc borate, calcium magnesium aluminosilicate, and sodium borosilicate.

21. A wear resistant fuel element for use in a nuclear reactor comprising:
    cladding means defining a cladding tube having an inside surface for containing a fissionable material, an outside surface, an upper end, and a lower end;
    coating means carried by said lower end of said outside surface comprising a matrix of ceramic material and glass, said ceramic material being bonded to said tube by said glass; and
    lower grid means for supporting said fuel element in an upright orientation, said lower end of said cladding tube being disposed below the lower grid means.

22. The fuel element of claims 21, wherein the coating is carried by only a portion of said tube including said tube lower end.

23. A wear resistant cladding tube for use in a nuclear reactor comprising:
    an inside surface for containing a fissionable material, and
    an outside surface having a coating comprising a matrix of ceramic material and glass, the glass having a coefficient of thermal expansion approximately equal to the coefficient of thermal expansion of the cladding tube material, the ceramic material being bonded to the outside surface by the glass.

24. The cladding tube of claim 23, wherein the cladding tube is substantially formed from a zirconium-alloy, the ceramic material comprises zircon, and the glass comprises a material selected from the group consisting of calcium zinc borate, calcium magnesium aluminosilicate, and sodium borosilicate.

25. The cladding tube of claim 24, wherein the coating has an outside surface substantially consisting of the ceramic material.

26. A wear resistant cladding tube for use in a nuclear reactor comprising:
an inside surface for containing a fissionable material, and
an outside surface having an upper end and a lower end, the lower end having a coating comprising a matrix of ceramic material and glass, the ceramic material being bonded to the outside surface by the glass.

27. The fuel element of claim 26 further comprising lower grid means for supporting the fuel element in an upright orientation wherein the lower end of the tube is disposed below the lower grid means.

28. The cladding tube of claim 26, wherein the glass and ceramic material have coefficients of thermal expansion approximately equal to the coefficient of thermal expansion of the cladding tube, the cladding tube is substantially formed from a zirconium alloy, the ceramic material comprises zircon, and the glass comprises a material selected from the group consisting of calcium zinc borate, calcium magnesium aluminosilicate, and sodium borosilicate.

* * * * *